(12) United States Patent
Qi

(10) Patent No.: US 10,768,081 B2
(45) Date of Patent: Sep. 8, 2020

(54) TEST DEVICE FOR THERMAL SIMULATION TESTER

(71) Applicant: CITIC Dicastal CO., LTD., Qinhuangdao, Hebei (CN)

(72) Inventor: Rongsheng Qi, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 79 days.

(21) Appl. No.: 16/202,232

(22) Filed: Nov. 28, 2018

(65) Prior Publication Data

US 2019/0293532 A1 Sep. 26, 2019

(30) Foreign Application Priority Data

Mar. 21, 2018 (CN) .......................... 2018 1 0233620

(51) Int. Cl.
*G01L 3/02* (2006.01)
*G01L 3/18* (2006.01)
*G01N 3/02* (2006.01)
*G01N 3/18* (2006.01)

(52) U.S. Cl.
CPC .................. *G01N 3/02* (2013.01); *G01N 3/18* (2013.01); *G01N 2203/0019* (2013.01); *G01N 2203/0226* (2013.01); *G01N 2203/0682* (2013.01)

(58) Field of Classification Search
None
See application file for complete search history.

(56) References Cited

U.S. PATENT DOCUMENTS

| 5,959,215 | A * | 9/1999 | Ono | G01N 3/36 73/789 |
| 6,142,662 | A * | 11/2000 | Narh | G01N 25/18 374/29 |
| 7,137,306 | B2 * | 11/2006 | Ferguson | G01N 3/04 73/818 |
| 7,363,822 | B2 * | 4/2008 | Lindeman | G01N 3/18 73/818 |
| 7,793,553 | B2 * | 9/2010 | Lindeman | G01N 3/04 73/856 |
| 9,535,078 | B2 * | 1/2017 | Dorman | G01N 35/00 |
| 10,067,077 | B2 * | 9/2018 | Blank | H02N 2/0095 |
| 2017/0066869 | A1 * | 3/2017 | Cruce | F16L 59/20 |

* cited by examiner

*Primary Examiner* — Natalie Huls
*Assistant Examiner* — Jermaine L Jenkins
(74) *Attorney, Agent, or Firm* — Cooper Legal Group, LLC

(57) ABSTRACT

A device for implementing a high-temperature plane strain compression test on a thermal simulation tester is provided. High-hardness and special-shaped pressure heads are located at the upper and lower ends of a sample; side shim plates and end shim plates with insulation and high pressure resistance are respectively located in grooves in the end faces and the inner sides of high-strength fixed plates, and the combined fixed plates are respectively located on the left and right sides of the sample; and the combined fixed plates are fixed via four through holes of the fixed plates by high-strength bolts, washers and nuts to limit the plane strain problem caused by the deformation of the sample in the normal direction of the fixed plates.

8 Claims, 5 Drawing Sheets

TEST DEVICE FOR THERMAL SIMULATION TESTER

CROSS-REFERENCE TO RELATED APPLICATIONS

The present application claims benefit of Chinese Patent Application No. 201810233620.8, filed on Mar. 21, 2018, the contents of which are hereby incorporated by reference in its entirety.

BACKGROUND

Plane strain problem is one of typical deformation behaviors of metal materials, such as spinning deformation and rolling deformation, and there is no strain in the direction perpendicular to the strain plane during deformation. The conventional plane strain compression test is carried out on a Gleeble thermal simulation tester, in which the strip wide plate is used as a sample, and the long and narrow hammer plate is used as a compression anvil to test stress-strain curves under different deformation parameters. Such a test method roughly has three shortcomings: 1, there is no strain that is ignored in the strain direction, and the value of the strain is small but true, so the data obtained from the test cannot truly describe the plane strain problem; 2, the sample is large, and the temperature is not distributed uniformly when the sample is heated, and is inconsistent with the set deformation temperature, resulting in inaccurate test data; and 3, when the compression deformation is tested, the tangential deformation tendency along the 45° direction is obvious, which has great influence on tissue observation of the deformed sample.

SUMMARY

The present disclosure relates to a device for implementing a plane strain compression test on a metal material at a high temperature.

Accordingly, the object of the present disclosure is to provide a high-temperature plane strain compression test device capable of accurately testing test data of a plane strain problem based on a Gleeble thermal simulation tester.

The present disclosure is mainly a device applied to a Gleeble thermal simulation tester for a high-temperature plane strain compression test of a metal sample, and the specific technical solution is as follows:

In one aspect of the present disclosure, provided is a test device for a thermal simulation tester, including an upper pressure head, a lower pressure head, side shim plates, end shim plates, fixed plates, bolts, washers and nuts, the upper pressure head includes a cylindrical portion and a flat portion, and the plane of the cylindrical portion is connected to the top side of the flat portion; the lower pressure head includes a cylindrical portion and a flat portion, and the plane of the cylindrical portion is connected to the top side of the flat portion; the upper pressure head and the lower pressure head are placed oppositely, and a sample space is reserved between the bottoms of the respective flat portions; the fixed plates are respectively arranged outside the two sides of the flat portions of the upper pressure head and the lower pressure head; the fixed plates are provided with grooves at the upper ends and the lower ends respectively; and the end shim plates are respectively arranged between the flat portions of the upper pressure head and the lower pressure head and the grooves of the fixed plates; and the fixed plates are provided with through holes and fixed by the bolts and the nuts.

In a preferred aspect of the present disclosure, the two end faces of the flat portions of the upper pressure head and the lower pressure head are provided with strip grooves perpendicular to the bottom surfaces of the cylindrical portions, and in the strip groove, the side shim plates are arranged between the flat portions and the fixed plates.

In a preferred aspect of the present disclosure, the upper pressure head and the lower pressure head are made of YG8 hard alloy steel.

In a preferred aspect of the present disclosure, the fixed plates are made of a high-temperature alloy.

In a preferred aspect of the present disclosure, the side shim plates are made of alumina ceramics.

In a preferred aspect of the present disclosure, the end shim plates are made of alumina ceramics.

In a preferred aspect of the present disclosure, the bolts are high-strength bolts.

In a preferred aspect of the present disclosure, the side shim plates are closely attached to the grooves in the inner side of the fixed plates, their widths are matched, and the gaps therebetween are not more than 1 mm.

In a preferred aspect of the present disclosure, the end shim plates are matched with the grooves at the two ends of the fixed plates in width, and the gaps therebetween are not more than 1 mm.

The present disclosure can be used for a high-temperature plane strain compression test of a metal sample, in which the fixed frame formed by the fixed plates, the side shim plates, the bolts and the nuts plays a role in limiting the deformation of the metal sample in a certain direction, and the sample is subjected to plane strain deformation under the action of the special-shaped pressure heads. The special-shaped pressure heads are preferably made of the same YG8 hard alloy steel as upsetting pressure heads of the Gleeble thermal simulation tester, and therefore have the characteristics of high compressive strength at high temperatures and oxidation resistance. The shape of the designed special-shaped pressure heads has the effects of transferring the load, avoiding crushing and guiding the motion. The fixed plates are preferably made of a high-temperature alloy, which can ensure that the fixed plates have good elastic deformation resistance at high temperatures. The side shim plates and the end shim plates are preferably made of alumina ceramics, play a role in insulating the current transmission between the special-shaped pressure heads and the fixed plates because of their high temperature resistance, insulation and high strength, and also avoid too high temperature rise of the fixed plates to ensure that the fixed plates have good rigidity during test. The four bolts are preferably high-strength bolts, and their high strength can ensure that the bolts are not elastically deformed during the test.

Compared with the prior art, the present disclosure has the following advantages:

1. The present disclosure can realize the high-temperature plane strain compression test of the sample on the thermal simulation tester;

2. The structure and material characteristics of the present disclosure can ensure that the data obtained by test accurately describes the plane strain problem;

3. The required sample is small when the present disclosure is applied, which can effectively avoid non-uniform temperature distribution of the sample and reduce the tangential deformation tendency of the sample in the 45° direction;

4. The present disclosure is simple in structure and easy to assemble, and the materials are all commercial common products, which are convenient to purchase and easy to process.

BRIEF DESCRIPTION OF DRAWINGS

The embodiments of the present disclosure will be described in detail below in combination with the accompanying drawings, in which.

Figure 1:
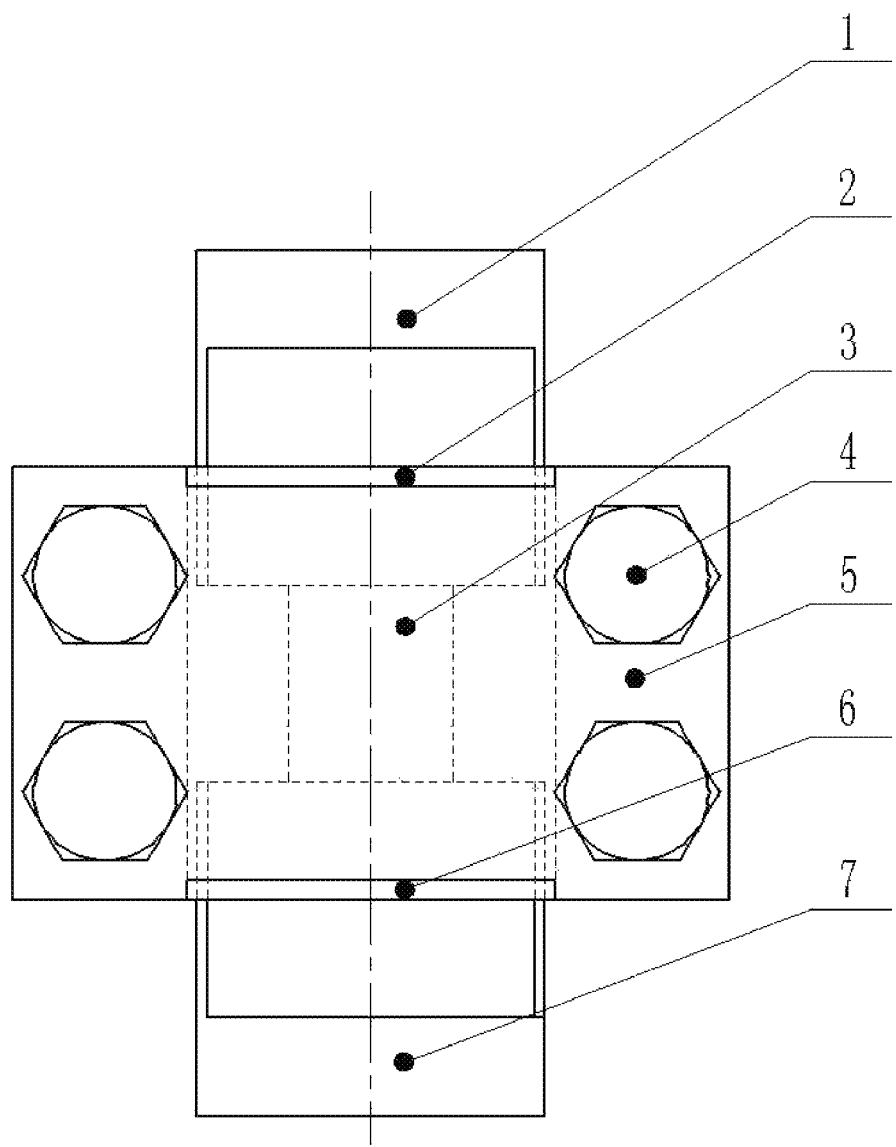
FIGS. 1, 2 and 3 are respectively a front view, a left view and a top view of a device according to embodiment 1 of the present disclosure.

LIST OF REFERENCE SYMBOLS 1 upper pressure head
2 first end shim plate
3 sample
4 bolt
5 fixed plate
6 second end shim plate
7 lower pressure head
8 first side shim plate
9 second side shim plate
10 washer
11 nut

DETAILED DESCRIPTION

Embodiment 1

Figure 2:
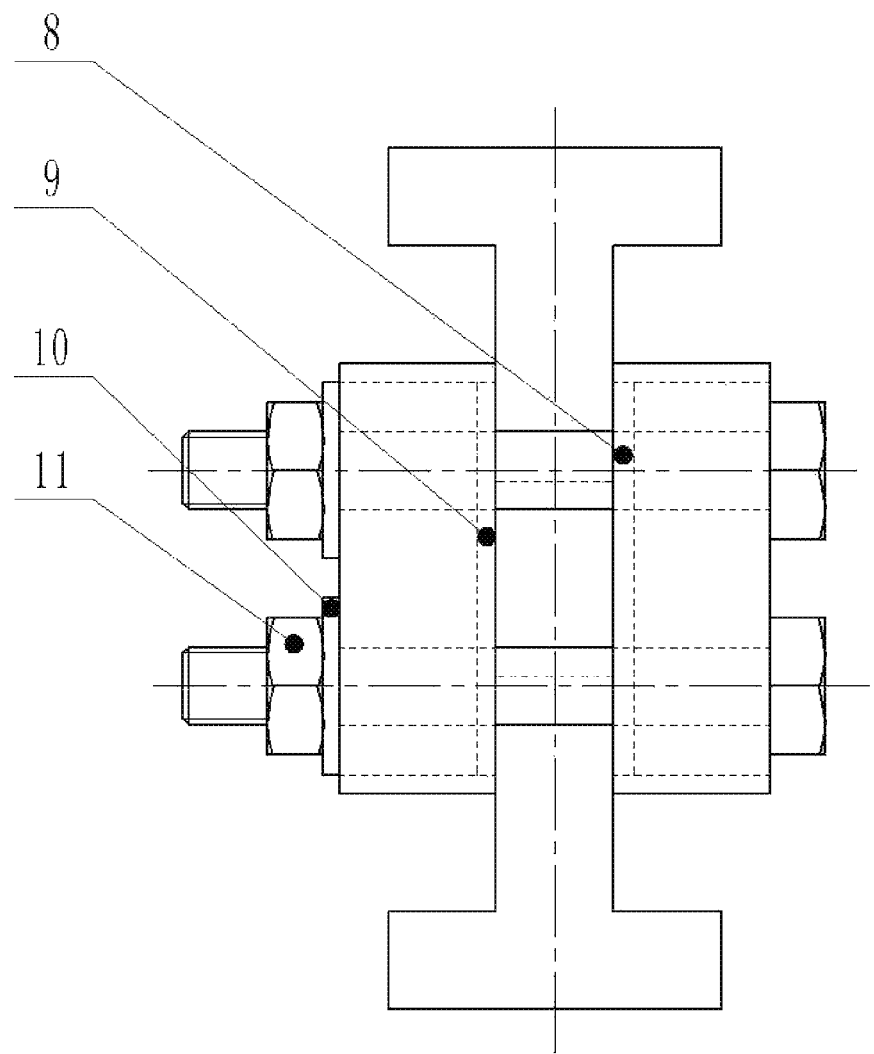
Figure 3:
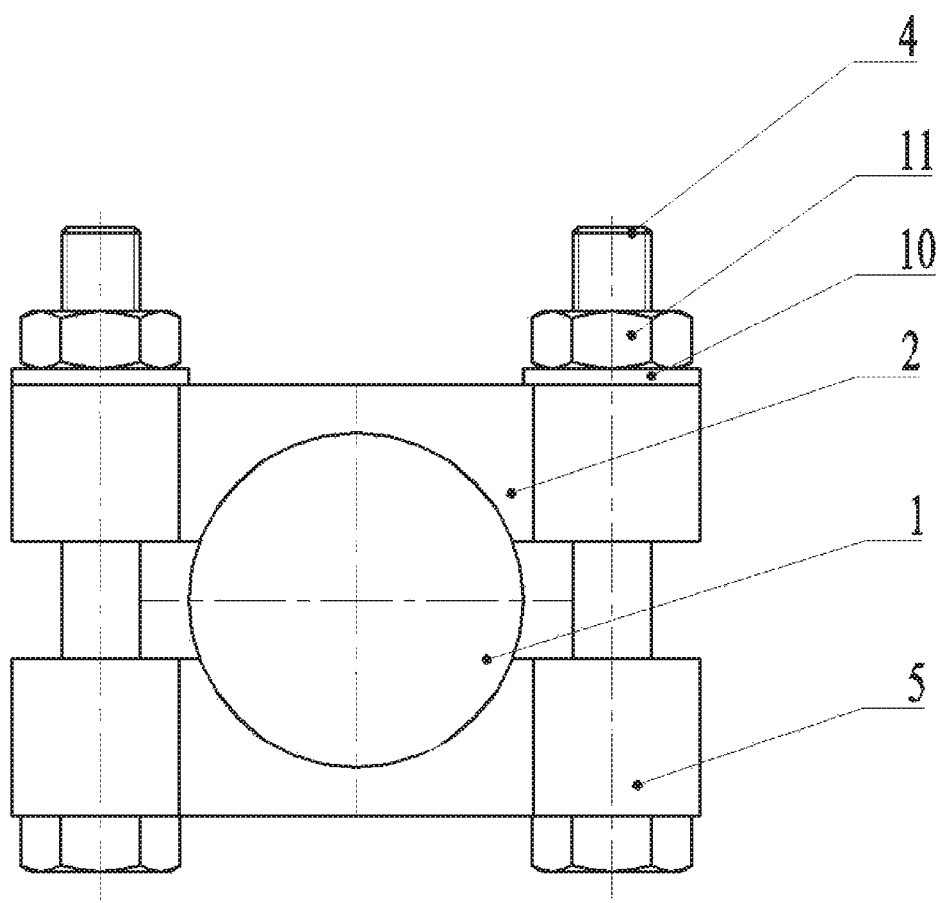
Figure 4:
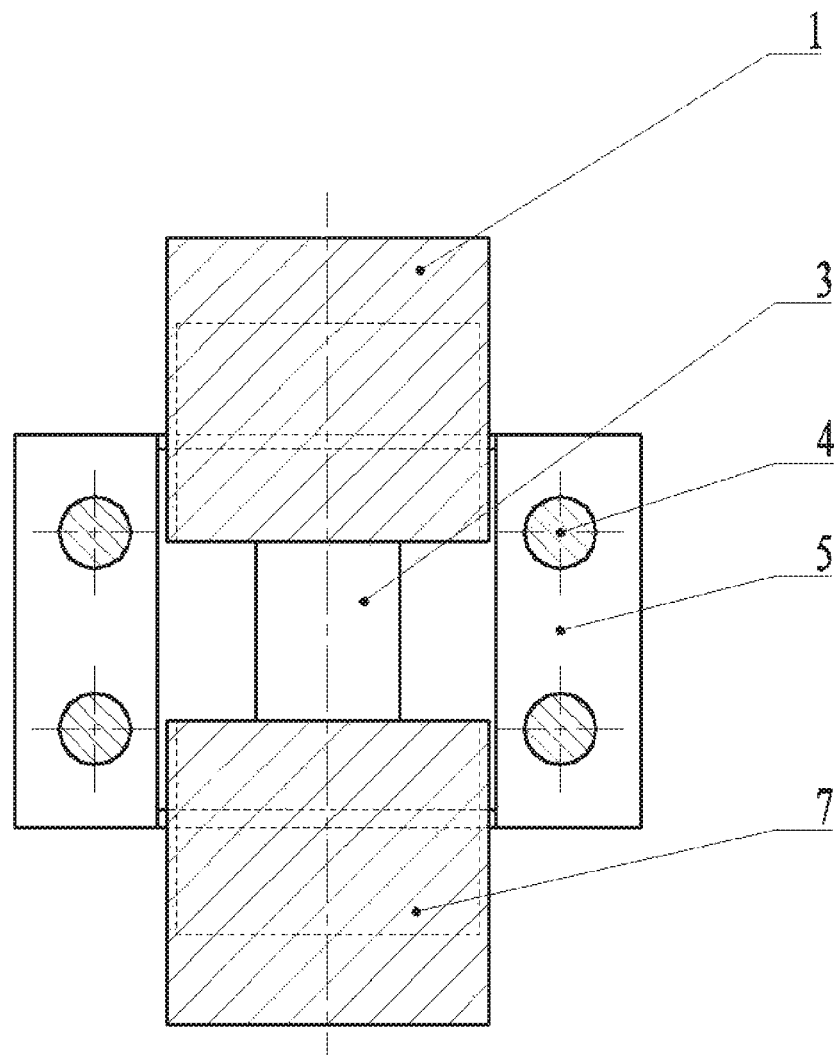
FIG. 4 is a cross-sectional view of the present disclosure.
Figure 5:
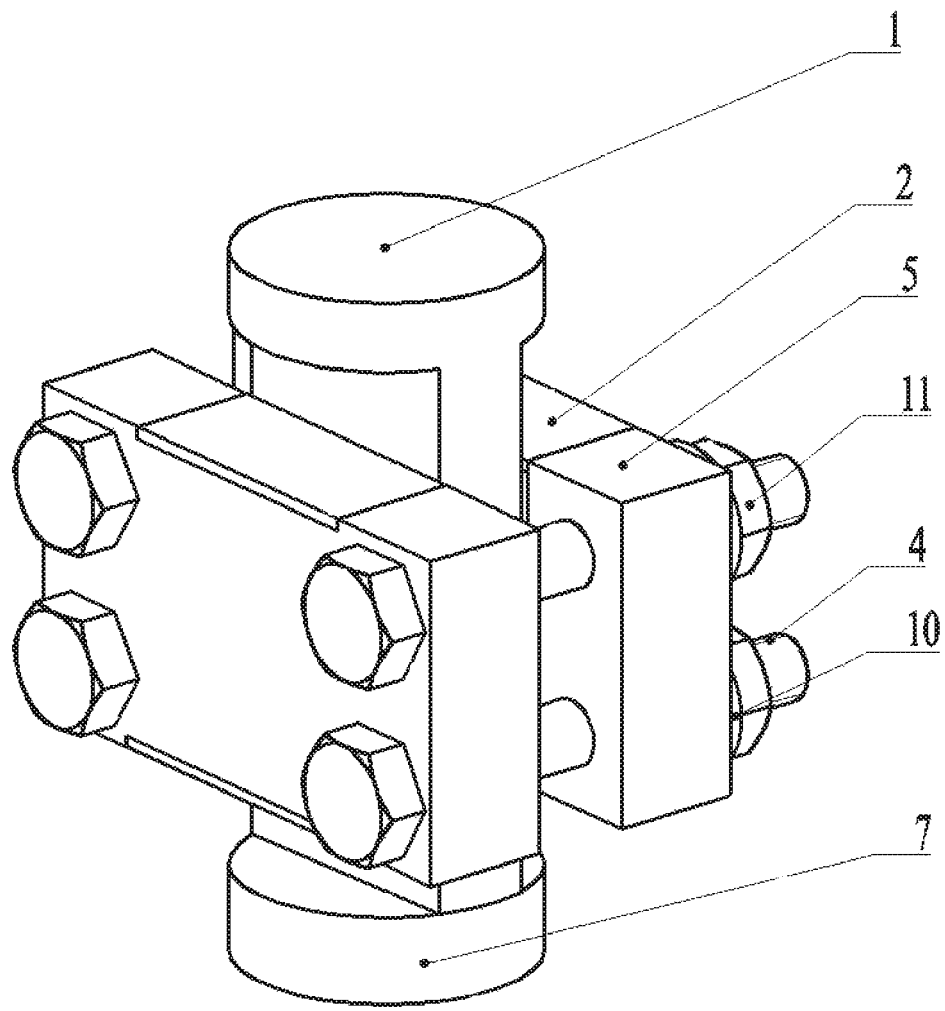
FIG. 5 is a three-dimensional view of the present disclosure.

In the schematic diagrams of the present disclosure shown in FIGS. 1, 2, 3, 4 and 5, the sample 3 is a cuboid, the upper pressure head 1 and the lower pressure head 7 made of YG8 hard alloy steel are respectively located at two ends of the sample 3, the thicknesses of the flat portions of the upper pressure head 1 and the lower pressure head 7 are equal to or smaller than the thickness of the sample 3, and the widths of the flat portions of the upper pressure head 1 and the lower pressure head 7 are greater than the width of the sample 3. The first end shim plate 2, the second end shim plate 6, the first side shim plate 8 and the second side shim plate 9 are all made of alumina ceramics and have a thickness of about 1 mm; the shim plates are respectively arranged in corresponding grooves of the two fixed plates 5 to form fixed combined plates; the fixed plates 5 are made of a high-temperature alloy, and the groove depths thereof are not more than 1 mm; and in order to ensure easy arrangement of the shim plates, the shim plates are spaced from the grooves at gaps of not more than 1 mm in the width direction. The fixed combined plates are placed on two sides of the sample 3, and the distances between the end faces of the cylindrical portions of the upper pressure head 1 and the lower pressure head 7 and the end shim plates 2, 6 are required to be substantially equal. Four bolts 4, washers 10 and nuts 11 apply pretightening force to limit the sample 3 through four through holes in the fixed plates 5.

During operation, the lower pressure head 7, the sample 3 and the upper pressure head 1 are vertically stacked orderly first to ensure that the axes of the three are substantially coincident. Then, the first end shim plate 2, the second end shim plate 6, the first side shim plate 8 and the second side shim plate 9 are respectively placed in the corresponding grooves of the two fixed plates 5 to form two combined fixed plates; the two combined fixed plates are placed on two sides of the sample 3, at the same time, the four bolts 4 are inserted, the washers 10 are sleeved and the nuts 11 are screwed; and during the process of screwing down the nuts 11, the distances between the end faces of the cylindrical portions of the upper pressure head 1 and the lower pressure head 7 and the end shim plates A 2 and B 6 are measured to adjust the position of the sample 3 in the frame formed by the combined fixed plates, the bolts 4 and the like, in which the optimal position of the sample 3 is located in the center of the frame. Finally, the assembled test device is clamped between upsetting anvil heads of the Gleeble thermal simulation tester, a thermocouple pre-welded at the middle section of the sample 3 is connected to the tester, the anvil heads of the tester, the upper pressure head 1, the lower pressure head 7 and the sample 3 form a circuit after power is supplied, the sample 3 regarded as a resistor is heated, compressed and deformed under a predetermined deformation condition, and corresponding test data is obtained.

The invention claimed is:

1. A test device for a thermal simulation tester, comprising an upper pressure head, a lower pressure head, side shim plates, end shim plates, fixed plates, bolts, washers and nuts, wherein the upper pressure head comprises a cylindrical portion and a flat portion, and a plane of the cylindrical portion is connected to a top side of the flat portion; the lower pressure head comprises a cylindrical portion and a flat portion, and a plane of the cylindrical portion is connected to a top side of the flat portion; the upper pressure head and the lower pressure head are placed oppositely, and a sample space is reserved between bottoms of the respective flat portions; the fixed plates are respectively arranged outside two sides of the flat portions of the upper pressure head and the lower pressure head; the fixed plates are provided with grooves at upper ends and lower ends respectively; the end shim plates are respectively arranged between the flat portions of the upper pressure head and the lower pressure head and the grooves of the fixed plates; and the fixed plates are provided with through holes and fixed by the bolts and the nuts, wherein two end faces of the flat portions of the upper pressure head and the lower pressure head are provided with strip grooves perpendicular to bottom surfaces of the cylindrical portions, and in the strip grooves, the side shim plates are arranged between the flat portions and the fixed plates.

2. The test device for a thermal simulation tester according to claim 1, wherein the upper pressure head and the lower pressure head are made of YG8 hard alloy steel.

3. The test device for a thermal simulation tester according to claim 1, wherein the fixed plates are made of a high-temperature alloy.

4. The test device for a thermal simulation tester according to claim 1, wherein the side shim plates are made of alumina ceramics.

5. The test device for a thermal simulation tester according to claim 1, wherein the end shim plates are made of alumina ceramics.

6. The test device for a thermal simulation tester according to claim 1, wherein the bolts are high-strength bolts.

7. The test device for a thermal simulation tester according to claim 1, wherein the side shim plates are closely attached to the grooves in an inner side of the fixed plates, widths of the side shim plates and the grooves are matched, and gaps therebetween are not more than 1 mm.

8. The test device for a thermal simulation tester according to claim 1, wherein the end shim plates are matched with the grooves at two ends of the fixed plates in width, and gaps therebetween are not more than 1 mm.

\* \* \* \* \*